(Model.)

I. P. WATSON.
CORN PLANTER.

No. 244,346. Patented July 12, 1881.

Witnesses:
J. W. Garner
W. S. D. Haines

Inventor:
Isaac P. Watson,
by his attorneys
C. A. Snow & Co.

UNITED STATES PATENT OFFICE.

ISAAC P. WATSON, OF CLIFFORD, INDIANA.

CORN-PLANTER.

SPECIFICATION forming part of Letters Patent No. 244,346, dated July 12, 1881.

Application filed May 31, 1881. (Model.)

*To all whom it may concern:*

Be it known that I, ISAAC P. WATSON, of Clifford, in the county of Bartholomew and State of Indiana, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form a part of this specification.

Figure 1:
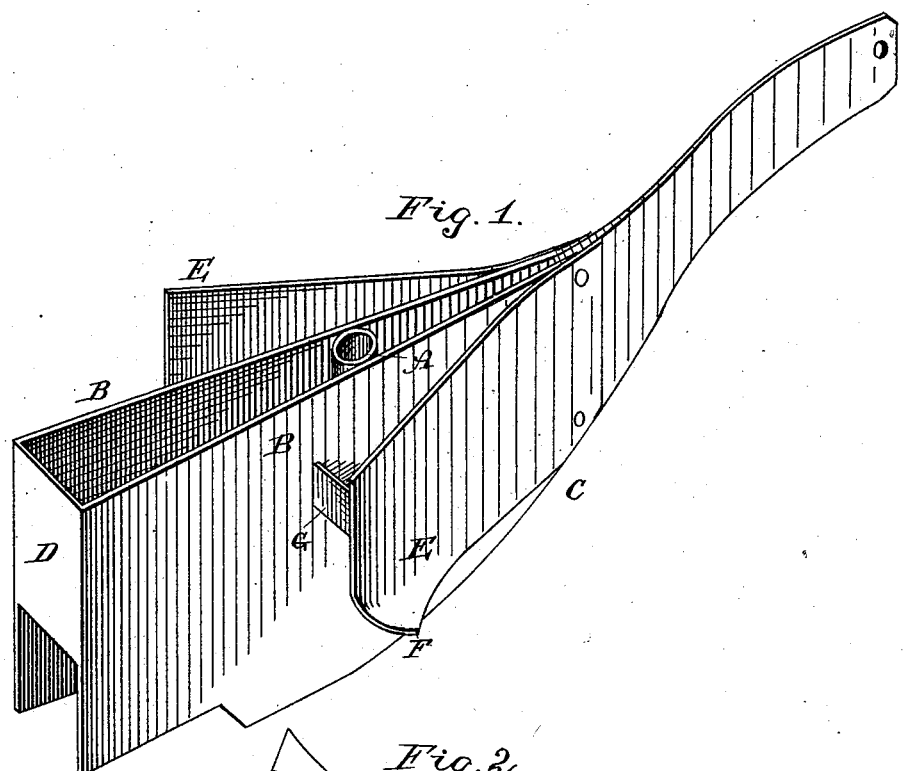
Figure 2:
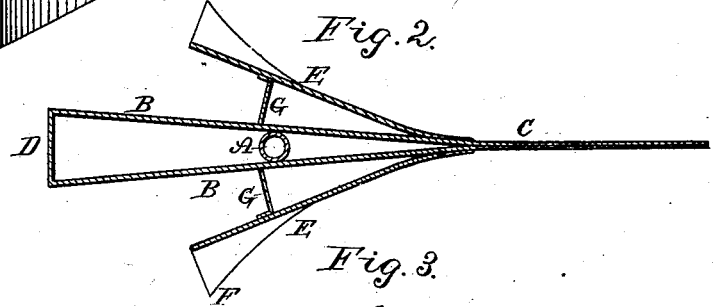
Figure 3:
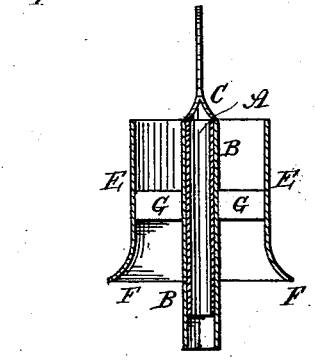

Figure 1 is a perspective view of my improved runner for corn-planters. Fig. 2 is a horizontal sectional view of the same; and Fig. 3 is a vertical cross-section taken through the feed-tube.

Corresponding parts in the several figures are denoted by like letters of reference.

This invention relates to two-horse corn-planters. In this class of devices one serious objection is almost invariably encountered—viz., the runners or soil-openers will sink to an unequal depth in the land, which is frequently broken several weeks before planting, thus depositing the seeds at an unequal depth, the difference frequently exceeding two inches.

To remedy this difficulty is the principal object of my invention.

Another and perhaps equally important function of my improvement is to remove from within a certain distance of the hills any young sprouts of grass and weeds, which, if allowed to grow, would choke and destroy the young corn.

The construction of my invention is as I shall now proceed more fully to describe with reference to the annexed drawings, in which—

A represents the seed-tube, which is inclosed between the blades B B of the ordinary runner, C, said blades being connected at their rear ends and in the usual manner by a cross-piece, D.

E E are two flanges or mold-boards secured to the outer sides of the blades B B, near the front ends of the latter, and having their lower edges, F, at a distance from the bottom edges of the blades B equal to the depth at which it is desired to plant the corn. The lower rear ends of the flanges E are turned outward, in the usual manner, and connected to the blades B by braces G.

The runners are attached to the planter in the usual manner.

In operation the runners may sink in the soil to any depth, according to whether it may be hard or mellow; but the flanges or mold-boards E will always scrape away from the furrow any superfluous soil, leaving the seed practically planted at equal depth. By thus removing the superfluous soil the young sprouts of grass or weeds are also scraped away from the furrow, thus preventing these from choking the young corn when the latter begins to sprout.

Having thus described my invention, I claim and desire to secure by Letters Patent of the United States—

1. The combination, with a runner for corn-planters, of a pair of flanged mold-boards secured to the sides of the same, serving as gages to graduate the depth and to throw the dirt outward from the sides of the furrow, as herein described, for the purpose set forth.

2. The combination, with a runner for corn-planters, of a pair of flanged mold-boards secured to the sides of the same, and having their lower edges parallel to those of said runner, as herein described, for the purpose shown and specified.

3. The combination of the runner C, consisting of blades B B, embracing the seed-tube A, and connected by the cross-piece D with the mold-boards E, bolted to the front ends of said blades and connected near their rear ends by braces G, as herein described, for the purpose shown and specified.

In testimony that I claim the foregoing as my own I have hereto affixed my signature in presence of two witnesses.

ISAAC P. WATSON.

Witnesses:
WILLIAM EVERROAD,
WILLIAM H. EVERROAD.